US008874062B2

(12) United States Patent
Le Corre et al.

(10) Patent No.: US 8,874,062 B2
(45) Date of Patent: *Oct. 28, 2014

(54) APPARATUS FOR REMOVING DC COMPONENTS INHERENT IN A RADIO FREQUENCY CHAIN

(71) Applicant: Broadcom Corporation, Irvine, CA (US)

(72) Inventors: Pascal Le Corre, Vem-sur-Seiche (FR); Stéphane Paquelet, Rennes (FR)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,665

(22) Filed: Mar. 26, 2013

(65) Prior Publication Data

US 2013/0223570 A1    Aug. 29, 2013

Related U.S. Application Data

(63) Continuation-in-part of application No. 13/175,457, filed on Jul. 1, 2011, now Pat. No. 8,442,155.

(51) Int. Cl.
*H04B 1/10* (2006.01)
*H04B 1/30* (2006.01)
*H04L 25/06* (2006.01)

(52) U.S. Cl.
CPC *H04L 25/06* (2013.01); *H04B 1/30* (2013.01); *H04B 1/10* (2013.01)
USPC .......................................... 455/312; 375/346

(58) Field of Classification Search
USPC ............................ 455/296, 311, 312; 375/346
See application file for complete search history.

(56) References Cited

U.S. PATENT DOCUMENTS

| 5,923,215 | A | 7/1999 | Hans |
| 6,480,061 | B2 | 11/2002 | Dolman et al. |
| 8,442,155 | B2 * | 5/2013 | Le Corre et al. ............... 375/319 |
| 2007/0184803 | A1 * | 8/2007 | Aytur .............................. 455/296 |
| 2008/0181334 | A1 * | 7/2008 | Okuni et al. ................... 375/319 |
| 2008/0182538 | A1 * | 7/2008 | Tanaka et al. ............... 455/234.1 |
| 2008/0198949 | A1 * | 8/2008 | Okuni et al. ................... 375/318 |
| 2009/0212983 | A1 |  8/2009 | Fukuzawa et al. |

FOREIGN PATENT DOCUMENTS

WO      WO 03/044949 A2    5/2003

OTHER PUBLICATIONS

French Patent Office (INPI) Search Report dated Feb. 17, 2011 issued in a related French Patent Application No. FR10/55363 (2 pages).

* cited by examiner

*Primary Examiner* — Nguyen Vo
(74) *Attorney, Agent, or Firm* — Foley & Lardner LLP

(57) ABSTRACT

Device for compensating a DC component inherent in any radio frequency chain in which from a single measurement, generally obtained from a digital stage, a set of multiple compensation values is determined by a compensation value vector generating module and which compensation values are applied to multiple compensation points of the analog chain. The compensation values are calculated by an iterative process converging toward cancellation of the DC component and avoid saturating amplification components and components of the analog-to-digital converter. The module includes compensation value calculation units each configured to calculate a respective compensation value and provide the calculated compensation value to the respective compensation point.

15 Claims, 3 Drawing Sheets

APPARATUS FOR REMOVING DC COMPONENTS INHERENT IN A RADIO FREQUENCY CHAIN

CROSS-REFERENCE TO RELATED APPLICATION

This application is a continuation-in-part of U.S. patent application Ser. No. 13/175,457 filed Jul. 1, 2011, which claims the benefit under 35 U.S.C. §119(a) and 37 CFR §1.55 to French Patent Application No. 10/55363 filed on Jul. 2, 2010, the entire disclosure of each of which is incorporated by reference herein.

BACKGROUND OF THE INVENTION

This invention relates to the domain of the suppression of the DC component inherent in any radio frequency chain. More particularly, the invention relates to apparatus for suppressing and possibly removing the DC component in a radio frequency reception device containing an analogue stage that processes a signal received from a digitization of this signal.

When a signal is transmitted by radio, it is generally modulated and carried by a "carrier" frequency. When the signal is received, the carrier is removed to provide a "baseband" signal. The signal is amplified and the DC component is reduced to a minimum before the signal is transmitted to the digital receiver. This type of transmission is used, for example, in the field of mobile telephony, Wi-Fi, Bluetooth and other transmissions.

FIG. 1 shows a simplified diagram of this reception. A radio frequency signal 1.1 is received by the device. It is then processed to remove the carrier by the block 1.2 which provides a baseband signal 1.3. This signal is transmitted to an analogue stage 1.4 intended to carry out an initial analogue processing on the signal. This analogue stage includes analogue components that might, exactly like block 1.2, add a DC component in the signal passing through these stages. This processing can include filtering, but often includes amplification of the signal received. This amplified signal 1.5 is then digitalized by an analog-to-digital converter 1.6, to provide a digital signal 1.7 before being transmitted for processing to a digital stage 1.8 depending on the type of device.

The different components of the analogue stages 1.2 and 1.4 are at the source of the appearance of a parasite DC component. The appearance of a DC component originates, inter alia, through the disparities of analogue components used in the construction of differential stages. The stages carrying out amplification functions should naturally be painstakingly elaborated to avoid successive amplifications of the DC component saturating the analog-to-digital converter downstream of the analogue chain. Such a component, even if with a low range, will continue to subsist regardless.

In practical terms, it can be observed that, without processing, these DC components can saturate amplification stages and the converter.

It is therefore indispensable to offer a processing system to remove all or part of the effect caused by these DC components before the converter.

It is known to carry out in a steady state, a retroactive low-pass filter loop to provide compensation at a single point of the analogue chain. This method raises the Issue that if the compensation point is at the end of the analogue chain, it is still possible for a previous amplification stage to be saturated. On the other hand, the DC component to be corrected is amplified by all the amplification stages and can be significant at this level. If the number of amplifiers of the chain increases, a single compensation point can turn out to be insufficient to avoid saturation upstream and downstream of this point.

SUMMARY OF THE INVENTION

The invention aims to resolve these aforementioned problems by a compensation process of the DC component inherent in any radio frequency chain allowing us to determine a set of multiple compensation values from a single measurement, generally situated in the digital stage that must be applied at multiple compensation points of the analogue chain. The compensation points are calculated by an iterative process converging towards a cancellation of the DC component and that avoids saturating the amplification components and the analog-to-digital converter.

The invention relates to a process of removing the DC component inherent in all radio frequency chains within a radio frequency reception device including at least one analogue stage. The analogue stage includes analogue components which can insert a DC component in the signal passing through the stage. The analogue stage has compensation points. At each compensation point, a compensation DC signal is added from the digital-to-analog conversion of a compensation value. All these compensation values form a compensation vector with the addition of all the signals to the compensation points aiming to cancel the DC component measured at the end of the analogue stage which includes the following phases:

a) a calculation phase of a gain vector with a number of components corresponding to the number of compensation points and of which each component is the product of gain and attenuation values of analogue components located downstream of the corresponding compensation point in the analogue stage;

b) a calculation phase of a corresponding unit gain vector by dividing the gain vector by its Euclidean norm;

c) a calculation phase of a first term where the value of the DC component estimated to be compensated by the Euclidean norm of the gain vector is divided and making the product of this result with the unit gain vector, possibly multiplied by a weighting value;

d) a calculation phase of die new compensation vector by adding to the first term a second term, possibly multiplied by a weighting made up of the current compensation vector or of the dot product of this current compensation vector with the unit gain vector multiplied by this unit gain vector; and e) a phase lowering the value obtained to the maximum admissible value by digital-to-analog converters used to generate the compensation signals when the value obtained is higher than this maximum admissible value.

According to a particular method of implementing the Invention, phases c), d) and e) are repeated iteratively.

The invention also concerns a radio frequency reception device including at least one analogue stage having a plurality of analogue components that can insert a DC component in the signal passing through the stage where the analogue stage has compensation points, adding to each compensation point a DC compensation signal from the digital-to-analog conversion of a compensation value. All these compensation values form a compensation vector. The addition of the set of signals to the compensation points aims to cancel the DC component measured at the end of the analogue stage, which includes:

a) calculating a gain vector with a number of components corresponding to die number of compensation points and of which each component is the product of gain and attenuation values of analogue components located downstream of the corresponding compensation point in the analogue stage;

b) calculating the corresponding gain vector by dividing the gain vector by its Euclidean norm;

c) calculating a first term where the value of the DC component estimated to be compensated by the Euclidean norm of the gain vector is divided making the product of this result with the unit gain vector, possibly multiplied by a weighting;

d) calculating the new compensation vector by adding a second term to the first term, possibly multiplied by a weighting value consisting of the current compensation vector or of the dot product of this current compensation vector with the unit gain vector multiplied by the unit gain vector; and e) lowering the value obtained from the maximum admissible value by the digital-to-analog converters used to generate the compensation signals when the value obtained is higher than this maximum admissible value.

BRIEF DESCRIPTION OF THE DRAWINGS

The characteristics of the invention mentioned above as well as others will appear more clearly on reading the following description of an implementation example, the description being made in relation to the appended drawings, among which.

DETAILED DESCRIPTION

From a single measuring point of the DC voltage located in the digital domain, the invention enables control of N subtracters responsible for removing the overall DC component. The implementation example shows the procedure for a value N equal to three subtracters but which can be directly extended to any number N subtracters, N being higher than or equal to two. The apparatus generates N compensation values which are applied to the analog signal, after conversion by N digital-to-analog converters, and thus are also referred to as compensation value calculation units.

When it is implemented from a digital-to-analog converter, the DC component subtracter has of course a limited dynamic. Hence, it seems important to remove the DC component once it appears, simply because its propagation through the amplification stages can lead to making a removal done downstream difficult if not impossible for lack of a dynamic for digital-to-analog converters. A solution entails placing multiple compensation points, particularly in front of each amplifier.

The method and apparatus disclosed herein aim to control these multiple compensation points, under non-saturation constraints, from a single measurement of the DC component made at the end of the chain. The fact of having a single point of measurement makes the system to be resolved under-determined. But considering the dynamic limitation of digital-to-analog converters, the system becomes constrained and soluble, while accepting a low implementation complexity solution.

Figure 1:
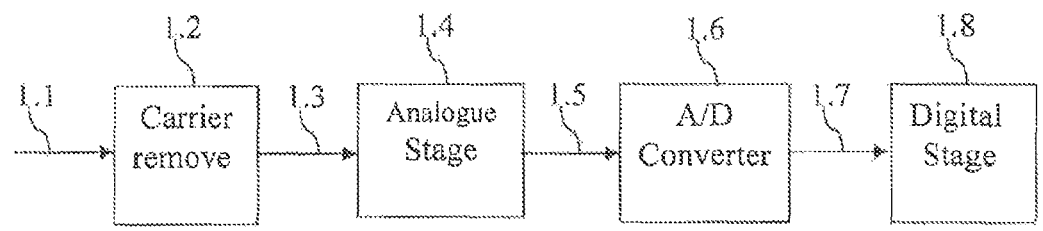
FIG. 1 shows a simplified diagram of a radio frequency reception.
Figure 2:
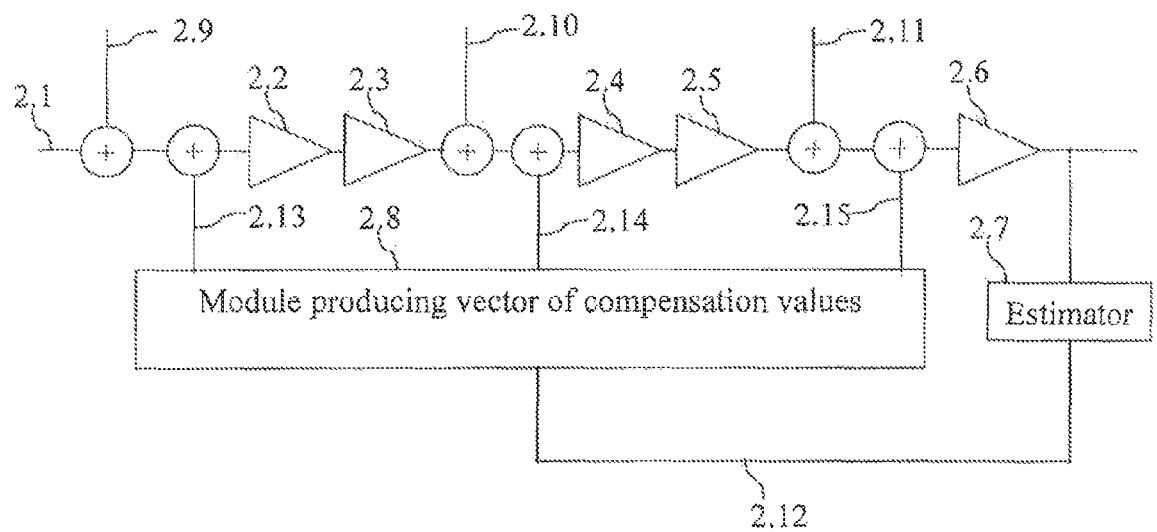
FIG. 2 shows the architecture of an implementation example of the invention.

FIG. 2 shows the architecture of the implementation example. In this example, we consider three amplification stages and of course three compensation points. However, the method can be generalized to any type of chain with at least two compensation points.

The baseband signal 2.1 is the input of the system characterized by an input voltage $V_{in}$. An initial amplification stage includes an amplifier 2.2 whose gain is referred to by $G_1$, followed by an attenuator 2.3 whose attenuation value is marked $A_1$. The second amplification stage includes an amplifier 2.4 whose gain is referred to by $G_2$, followed by an attenuator 2.5 whose attenuation value is marked $A_2$. The third amplification stage includes an amplifier 2.6 whose gain is referred to by $G_3$. The signal coming out of the amplifier is characterised by its output voltage marked $V_{out}$. The DC voltage of the output signal is calculated in a supposedly perfect way by the estimator 2.7 which is generally inserted into the digital stage and is therefore estimated alter the analog-to-digital conversion of the output signal. This DC voltage 2.12 named $\delta_{ff}$ is provided to a module 2.8 according to the invention which is responsible for producing the vector of compensation values 2.13, 2.14 and 2.15 named respectively $-\Delta_1$, $-\Delta_2$ and $-\Delta_3$. These values are represented with a sign "−" to signify that the adders will remove a value $\Delta_i$ from the signal. It must be understood here that the compensation values are calculated digitally in the module 2.8 (for example, by hardware as shown FIG. 4 described below) and that the values are transmitted to digital-to-analog converters to produce the compensation signal. The voltages added to the signal 2.9, 2.10 and 2.11 fictively represent the addition to the signal of DC voltage values which are really added by the different analog components composing the analog chain. Their values are referred to by $\delta_1$, $\delta_2$ and $\delta_3$, respectively. These DC voltages are supposed to be removed. Their values are not known beforehand.

Initially, the gain values $G_i$ and the attenuator valises of $A_i$ are supposed to be known, but in the iterative implementation method a significant tolerance on a supposed value of these gains and attenuators is enough to ensure convergence towards cancellation of the DC component.

To resolve the problem, the existence of additional fictive DC voltages to the input of each amplifier is considered. The $\Delta_1$, $\Delta_2$ and $\Delta_3$ removal commands applied at instant t are considered so imperfect that it is possible to measure a final non-zero value of the DC component at the end of the chain marked $\delta_{ff}$.

It is also supposed that the block capable of estimating the DC voltage at the end of the chain is able to perfectly estimate the DC voltage in the output signal, directly measured for a zero time-average input signal, which in practice is always true. This measure is linked to other parameters at instant t by:

$$(((\delta_1-\Delta_1)G_1A_1+(\delta_1-\Delta_2))G_2A_2+(\delta_3-\Delta_3))G_3=\delta_{ff} \quad (1)$$

The problem now consists of seeking new $\Delta'_1$, $\Delta'_2$ and $\Delta'_3$ controls allowing the DC component to be cancelled at the end of the chain at instant t' with t'>t.

The new $\vec{\Delta}'$ compensation control vector to be applied to instant t' therefore verifies the relation (2) at instant t':

$$(((\delta_1-\Delta'_1)G_1A_1+(\delta_2-\Delta'_2))G_2A_2+(\delta_3-\Delta'_3))G_3=0 \quad (2)$$

To simplify the paperwork, we will adopt a vector notation for control vectors. We will define the following vectors:

$$\vec{\Delta}=[\Delta_1 \Delta_2 \Delta_3]^T;$$

$$\vec{\Delta}'=[\Delta'_1 \Delta'_2 \Delta'_3]^T;$$

$$\vec{\Delta}^{diff}=\vec{\Delta}'-\vec{\Delta}=[\Delta_1^{diff} \Delta_2^{diff} \Delta_3^{diff}]^T$$

From equations (1) and (2) and by introducing the differential vector control marked $\vec{\Delta}^{diff}$ comes:

$$((\Delta_1^{diff}G_1A_1+\Delta_2^{diff}G_2A_2+\Delta_3^{diff})G_3-\delta_{diff}=0 \quad (3)$$

It can be noted that the Active additional voltages disappear from the equation system to be resolved. By introducing the gain vector $\vec{G}$ below:

$$\vec{G} = \begin{bmatrix} G_1G_2G_3A_1A_2 \\ G_2G_3A_2 \\ G_3 \end{bmatrix} \quad (3)$$

The equation (3) is now written:

$$\vec{G}\cdot\vec{\Delta}^{diff}-\delta_{ff}=0 \quad (4)$$

Generally, the gain vector $\vec{G}$ is expressed as a vector with the number of components corresponding to the number of compensation points and where each component is the product of gain and attenuation values for analog components located downstream of the compensation point in the analog stage.

This non-constrained system is under-determined. But if it is considered that one of the aims of the invention is to avoid saturation of digital-to-analog converters, an additional constraint is determined. The converters used to generate compensation signals $\Delta$, are considered to be removed from the level of compensation points. $\Delta_{max}$ is noted as the maximum deviation of these converters, i.e., the maximum possible compensation value at the level of each compensation point. Each component of the new control vector in absolute value must be less than $\Delta_{max}$. The mathematical formula deriving from this is written:

$$\|\vec{\Delta}+\vec{\Delta}_{diff}\|_\infty \leq \Delta_{max} \quad (5)$$

The infinite norm signifies that each component of the control vector is less than the absolute value at $\Delta_{max}$. Given the phenomenon of the quantification of converters and taking into account the constraint defined by the equation (5), it is not certain that the equation (4) admits of a solution. The problem can be generalized by seeking to minimize the difference $\vec{G}\cdot\vec{\Delta}^{diff}-\delta_{ff}$ which will not deprive us from finding a solution making this difference zero if this is still possible.

If P is the new problem to resolve, it is formulated as follows:

$$P: \begin{cases} \mathrm{argmin}_{\Delta_{diff}} |\vec{G}\cdot\vec{\Delta}^{diff}-\delta_{ff}| \\ \|\vec{\Delta}+\vec{\Delta}^{diff}\|_\infty \leq \Delta_{max} \end{cases}$$

The mathematical formula above means that what is being sought is the differential vector minimizing in absolute value the difference $|\vec{G}\cdot\vec{\Delta}^{diff}-\delta_{ff}|$ under the constraint $$\|\vec{\Delta}+\vec{\Delta}^{diff}\|_\infty \leq \Delta_{max}.$$

This mathematical approach integrates the fact that each control should not saturate the digital-to-analog converters. It aims to redeploy the cancellation control of the DC component on the three compensation points. It takes into account the fact that there is no certainty of completely cancelling the DC component because, inter alia, of problems of quantification and of the imperfect, knowledge of the exact gain values of analog components.

It may seem desirable that each compensation value $\Delta_i$ will exactly compensate the DC component $\delta_i$ inserted upstream into the analog chain of the compensation point. This approach nevertheless includes inconveniences. It requires possession of as many measurement points as compensation points, which will be costly. And even if these measuring points are available, the compensation values corresponding to these measured values that should be applied would be likely to saturate the digital-to-analog converters. One of the advantages of the distribution over all the compensation points to be provided is limiting these saturations.

To resolve this mathematical problem with the infinite norm leads to difficulties. We suggest defining a related problem for which we justify that, for main cases, the solutions to this new problem are also solutions of the problem to be resolved.

Let us call this related problem P*. This new problem uses the Euclidean norm subscripted 2 in the formulas and no longer the infinity norm.

The question now is to seek to minimize the controls so as not to be in a duty point likely to saturate the digital-to-analog converters. The vector controls which could previously be part of a cube, in the three dimensional case of three compensation points, are no longer limited. The fact of seeking to minimize the vector norm has, despite everything, the effect of generally minimizing the vector values, but without guaranteeing that any of these values can exceed the maximum threshold $\Delta_{max}$.

The problem is rewritten this time stipulating that we will seek to determine the controls of minimum amplitudes under the constraint of completely cancelling the DC component at the end of the chain. This new formulation leads to resolving the following P* problem:

$$P^*: \begin{cases} \mathrm{argmin}_{\Delta_{diff}} \|\vec{\Delta}+\vec{\Delta}^{diff}\|_2 \\ \vec{G}\cdot\vec{\Delta}^{diff}-\delta_{ff}=0 \end{cases}$$

We can verify that:

If $\vec{\Delta}^{diff}$ is a solution to P* and $\|\vec{\Delta}+\vec{\Delta}^{diff}\|_\infty \leq \Delta_{max}$ then $\vec{\Delta}^{diff}$ is also a solution of P; and If the control obtained does not verify the saturation, constraint, it is always possible to suggest an admissible control of the value $\Delta_{max}$ if the value obtained by the calculations is higher than $\Delta_{max}$ in absolute value. This is said to be saturating the control.

Assuming that there is a calibration phase capable of providing a first vector $\vec{\Delta}$ with fair approximation, another alternative could be to find solutions that seek not to deviate too much from the calibration controls. In this case, we would seek to minimize the corrections made to the compensation values and not the latter. This P** problem is expressed as follows:

$$P^{**}: \begin{cases} \mathrm{argmin}_{\Delta_{diff}} \|\vec{\Delta}^{diff}\|_2 \\ \vec{G}\cdot\vec{\Delta}^{diff}-\delta_{ff}=0 \end{cases}$$

This alternative approach leads to a similar resolution as that of P* which we develop below.

To resolve the problem P*, we will break down the gain vector $\vec{G}$ in a system of orthonormed coordinates. The first dimension is that of the vector itself and its orthogonal plan. We have to remember that we are now thinking in three dimensions because the implementation example is based on 3 compensation points, but the thinking applies in a similar way to N dimensions, N higher or equal to two. This introduces the following notation:

$$\vec{G} = \|\vec{G}\| \vec{g} \quad (6)$$

A natural breakdown of this space consists in choosing as the system base, the trihedron $\{\vec{g}, \vec{g}_\theta, \vec{g}_\phi\}$ composed of the unit vector $\vec{g}$ proportional to $\vec{G}$ and is completed by two vectors $\vec{g}_\theta$ and $\vec{g}_\phi$ according to usual conditions of orthogonality.

The differential control vector is thus written:

$$\vec{\Delta}^{diff} = \Delta_g^{diff} \vec{g} + \Delta_\theta^{diff} \vec{g}_\theta + \Delta_\phi^{diff} \vec{g}_\phi$$

With the help of this sound system of coordinates, we will resolve the equation (4) to obtain the general form of the differential control vector.

$$\vec{G} \cdot \vec{\Delta}^{diff} - \delta_{ff} = \|\vec{G}\| \vec{g} \cdot \vec{\Delta}^{diff} - \delta_{ff}$$
$$= \|\vec{G}\| \left( \Delta_g^{diff} \underbrace{\vec{g} \cdot \vec{g}}_{=1} + \Delta_\theta^{diff} \underbrace{\vec{g} \cdot \vec{g}_\theta}_{=0} + \Delta_\phi^{diff} \underbrace{\vec{g} \cdot \vec{g}_\phi}_{=0} \right) - \delta_{ff} w$$
$$= \|\vec{G}\| \Delta_g^{diff} - \delta_{ff} = 0$$

This comes to:

$$\Delta_g^{diff} = \frac{\delta_{ff}}{\|\vec{G}\|} \quad (7)$$

It can be seen that the resolution of the equation (4) leads only to fixing the component of the differential control vector in the direction of $\vec{g}$. The general form of the differential control vector allows us to obtain a zero DC component which can be expressed thus:

$$\vec{\Delta}^{diff} = \frac{\delta_{ff}}{\|\vec{G}\|} \vec{g} + \Delta_\theta^{diff} \vec{g}_\theta + \Delta_\phi^{diff} \vec{g}_\phi \quad (8)$$

With $\Delta_\theta^{diff}$ and $\Delta_\phi^{diff}$ two random scalars.
In order to simplify the notations, we can put down:

$$\alpha = \Delta_\theta^{diff} \text{ and } \beta = \Delta_\phi^{diff};$$

The equation (8) then becomes:

$$\vec{\Delta}^{diff} = \frac{\delta_{ff}}{\|\vec{G}\|} \vec{g} + \alpha \vec{g}_\theta + \beta \vec{g}_\phi \quad (9)$$

To calculate the effective compensation values, we must remember that the problem P* sought to minimise the Euclidean norm $\|\vec{\Delta} + \vec{\Delta}^{diff}\|_2$.

To calculate this Euclidean norm, we start by breaking down the vector control $\vec{\Delta}$ according to the base $\{\vec{g}, \vec{g}_\theta, \vec{g}_\phi\}$.

$$\vec{\Delta} = \Delta_g \vec{g} + \Delta_\theta \vec{g}_\theta + \Delta_\phi \vec{g}_\phi$$

This comes to:

$$\|\vec{\Delta} + \vec{\Delta}^{diff}\|_2 = \left( \Delta_g + \frac{\delta_{ff}}{\|\vec{G}\|} \right)^2 + (\Delta_\theta + \alpha)^2 + (\Delta_\phi + \beta)^2$$

The solutions minimizing this norm are:

$$\alpha = -\Delta_\theta; \beta = -\Delta_\phi$$

This ends up with a solution which provides the expression of the new compensation vector $\vec{\Delta}'$ allowing us to cancel the DC component at instant t'>t by minimising the Euclidean norm of the control vector:

$$\vec{\Delta} + \vec{\Delta}^{diff} = \left( \Delta_g + \frac{\delta_{ff}}{\|\vec{G}\|} \right) \vec{g} = \left( \vec{\Delta} \cdot \vec{g} + \frac{\delta_{ff}}{\|\vec{G}\|} \right) \vec{g} = \frac{\delta_{ff}}{\|\vec{G}\|} \vec{g} + (\vec{\Delta} \cdot \vec{g}) \vec{g}$$

Similarly, the problem P** leads to the solution:

$$\vec{\Delta} + \vec{\Delta}^{diff} = \frac{\delta_{ff}}{\|\vec{G}\|} \vec{g} + \vec{\Delta}$$

It should be remembered that this solution should as a rule avoid saturating the digital-to-analog converters. Components whose absolute value is higher than $\Delta_{max}$ are thus reduced to this value $\Delta_{max}$.

These formulas can be generalized to define a family of formulas allowing us to resolve the technical problem.

On one hand, access to the theoretical value of $\vec{G}$ is not required, but only access to a measured approximation referred to as $\hat{\vec{G}}$ allowing a deduction of another approximate value $\hat{\vec{g}}$.

It can be shown that the convergence of the equations is maintained if the theoretical gain values are replaced by the approximations on condition that the following inequality is complied with:

$$\left| 1 - \frac{\hat{\vec{g}} \cdot \vec{G}}{\|\hat{\vec{G}}\|} \right| < 1$$

Expressed in the form of recursively defined sequences, the following formulas are obtained:

$$P^*: \vec{\Delta}_{n+1} = \left( a_n \vec{\Delta}_n \cdot \hat{\vec{g}} + b_n \frac{\delta_n^{ff}}{\|\hat{\vec{G}}\|} \right) \hat{\vec{g}}$$

and $$P^{**}: \vec{\Delta}_{n+1} = a_n \vec{\Delta}_n + b_n \frac{\delta_n^{ff}}{\|\hat{\vec{G}}\|} \hat{\vec{g}}$$

where the sequences $a_n$ and $b_n$ are weighting values or weighting factor sequences. These new formulas remain convergent and thus resolve the technical problem if these weighting factor sequences comply with the condition of tending to 1 if n tends towards infinity. Indeed, it is possible for the weighting value to equal 1. The $\delta_n^{diff}$ which appears in the formula corresponds to $\delta_{ff}$ in other formulas measured in each iteration.

Figure 3:
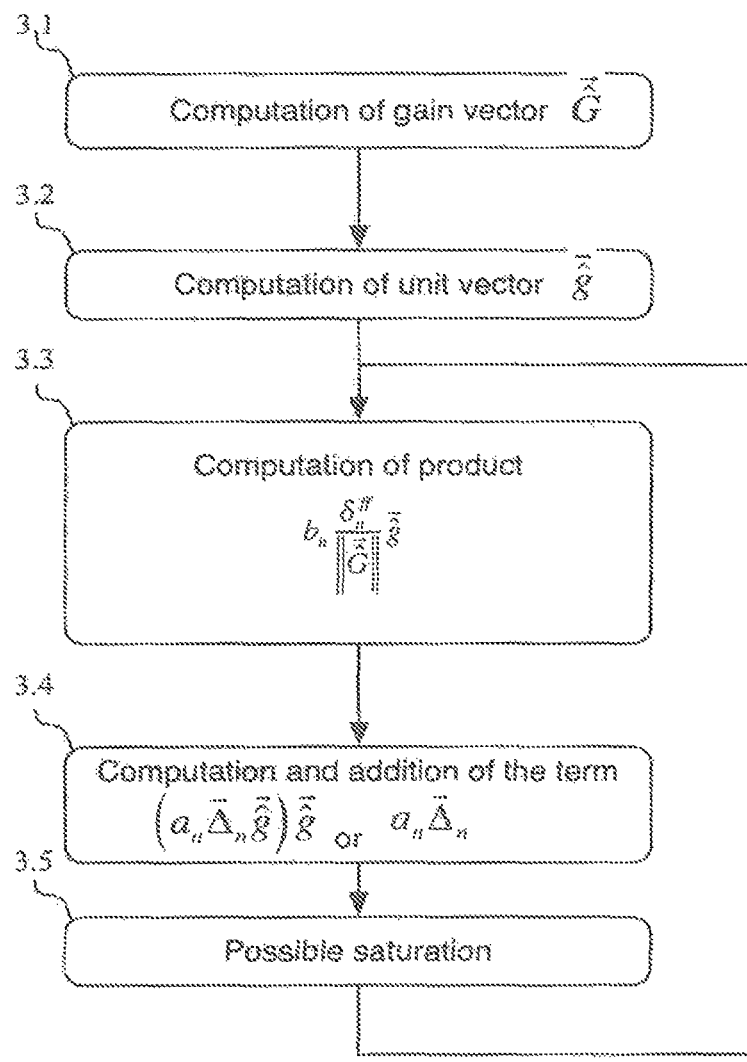
FIG. 3 shows a flow chart of the calculation procedure for the compensation vector according to an implementation example of die invention.

In practice, the procedure cancelling the DC component in a radio frequency reception device is implemented according to the flow chart in FIG. 3.

Referring thus to FIG. 3, according to an initial step 3.1, the gain vector $\vec{G}$ of the analog stage is calculated. This calculation can take into account prior knowledge of the components of the stage or are measured during the device's manufacturing process. Advantageously, since this vector is ideally invariant, its value is stored in the device's memory. According to a second step 3.2, the corresponding unit gain vector $\vec{g}$ is deduced from the $\vec{G}$ vector by dividing the gain vector by its Euclidean norm. This vector is also advantageously stored in the device's memory. According to step 3.3, a first term is calculated corresponding to $$\frac{\delta_{ff}}{\|\vec{G}\|} \vec{g}$$

taking the value to be compensated $\delta_{ff}$ divided by the norm of the gain vector $\|\vec{G}\|$ and by making the product of this value with the unit gain vector $\vec{g}$. The initial value of the compensation vector $\vec{\Delta}$ can be obtained in a variable manner. It can result from tests or calculations made during the manufacture of the device. It can also be calculated by uniform distribution of an initial value to be compensated $\delta_{ff}$ on the multiplicity of compensation points.

During a step 3.4, the new compensation vector $\vec{\Delta} + \vec{\Delta}^{diff}$ is calculated by adding to the first term calculated in step 3.3, a second term made up of the scalar product of the standard compensation vector $\vec{\Delta}$ by this vector unit gain vector $\vec{g}$. The initial value of the compensation vector $\vec{\Delta}$ can be obtained in a variable manner. It can result from tests or calculations done during the production of the device. It can also be calculated by uniform distribution of an initial value to be compensated $\delta_{ff}$ on the multiplicity of compensation points. Alternatively, the solution of the problem P** is implemented, a second term composed of the standard compensation vector $\vec{\Delta}$ is added.

During step 3.5, it is possible to verify that none of the components of the compensation vector obtained exceeds the capacities of the -digital-to-analog converters which will produce the corresponding compensation signal. If this is the case, the value obtained is reduced to the maximum admissible value. Although in theory, a single calculation phase can allow the DC component generated by the different analog components of the analog stage to be cancelled, this is not always the case. Because of imperfect knowledge of the different gains and possible saturation of some compensation values, even taking into account a possible development in time of the behavior of some components and because the input signal. $V_{in}$ is not identically zero but time-average zero, it is preferable to iteratively repeat steps 3.3 to 3.5. The calculation done iteratively in this way guarantees that it will evolve towards and preserve a cancellation of the DC component generated.

Figure 4:
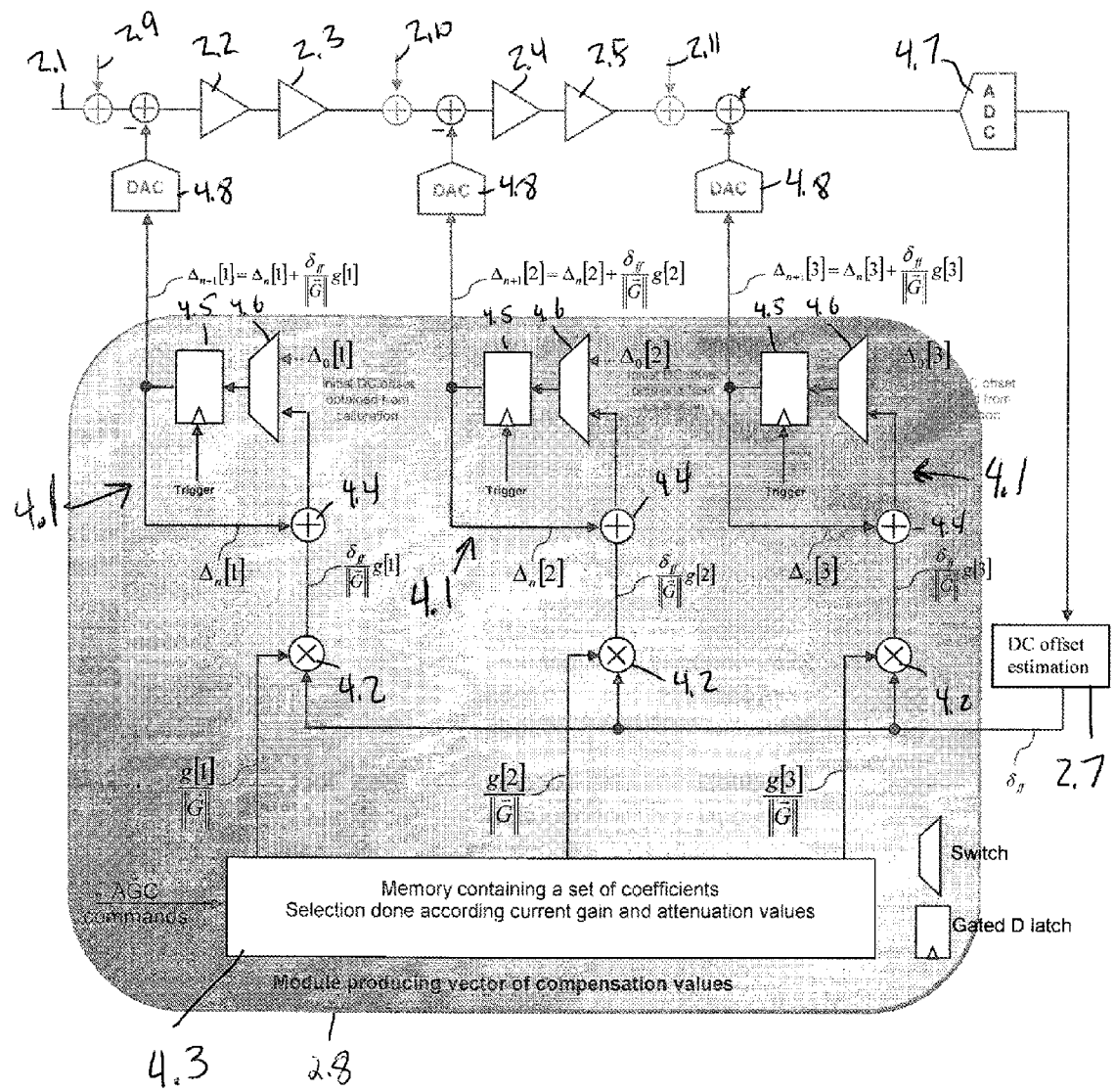
FIG. 4 is a detailed view of the module chat generates the compensation vector.

Referring now to FIG. 4, one embodiment of the module 2.8 is illustrated and includes a plurality of compensation value calculation units 4.1, each of which is configured to calculate a respective one of the compensation values 2.13, 2.14 and 2.15, also referred to as $-\Delta_1$, $-\Delta_2$ and $-\Delta_3$, respectively. The compensation value calculation units 4.1 provide the calculated compensation value 2.13, 2.14, 2.15 to the respective one of the compensation points (see FIG. 2). Each compensation value calculation unit 4.1 includes a multiplier 4.2 that multiplies a DC offset estimation value obtained from the end of the analog stage (from estimator 2.7) and a respective coefficient dependent on current gain and attenuator values. To provide the coefficients $$\frac{g[1]}{\|\vec{G}\|}, \frac{g[2]}{\|\vec{G}\|}, \frac{g[3]}{\|\vec{G}\|},$$

a memory 4.3 contains a set of coefficients, and selection of which coefficient to provide is based on the current gain and/or attenuation values. One or more AGC commands are used to effect the selection of the coefficients to be provided to the multipliers 4.2.

Each compensation value calculation unit 4.1 also includes an adder 4.4 that adds the product of the coefficient and the DC offset estimation value to an output of a gated D latch 4.5, and provides the sum to a switch 4.6. Switch 4.6 of each compensation value calculation unit 4.1 also receives an initial DC offset $\Delta_0[1]$, $\Delta_0[2]$, $\Delta_0[3]$, respectively, obtained from calibration to enable initiation of the module 2.8. Trigger signals are applied to the gated D latches 4.5 as soon as all operations performed by the multipliers 4.2 and the adders 4.4 on the DC offset estimation will be conducted. Accordingly, the first compensation values $-\Delta_1$, $-\Delta_2$ and $-\Delta_3$ provided by the calculation units 4.1 is based on the initial DC offset $\Delta_0[1]$, $\Delta_0[2]$, $\Delta_0[3]$, and subsequent compensation values provided by the calculation units 4.1 are based on the immediately preceding compensation value and the product of the coefficients provided by the memory 4.3 and the DC offset estimation value provided by the estimator 2.7. The generated compensation values from gated D latches 4.5 are then provided to respective digital-to-analog converters 4.8 to be applied to the analog stage. Equation P** above is therefore satisfied, considering the weighting values or factor sequences to equal 1.

The hardware structure shown in FIG. 4 exemplifies non-limiting hardware components that may be used to generate the compensation values that, when applied to the analog stage 1.4, effect reduction and eventual removal of the DC component. Using basic hardware components such as multipliers 4.2, adders 4.4, gated D latches 4.5, and switches 4.6, this hardware-based structure carries out the DC removal solution described by the algorithm P**. According to the dynamic modification of gain values and attenuation values of the radio frequency chain (between the first compensation point and the ADC 4.7), the inputs $$\frac{g[1]}{\|\vec{G}\|}, \frac{g[2]}{\|\vec{G}\|}, \frac{g[3]}{\|\vec{G}\|},$$

of this hardware structure are changed dynamically.

In a preferred embodiment, the DC offset estimation provided to multipliers 4.2 is obtained after integrating the DC offset signal over N samples and dividing the accumulation result by N. The hardware is greatly simplified when N is a power of 2, As such, the solution is hardware-based.

In alternative embodiments, there are other ways to implement the module 2.8, whether hardware-based, microprocessor-based or a combination of both. The selection criteria are generally dictated by system constraints, such as the speed at which the values of the compensation points must be updated.

Having described exemplary embodiments of the invention with reference to the accompanying drawings, It will be appreciated that the present invention is not limited to those embodiments, and that various changes and modifications can be effected therein by one of ordinary skill in the art without departing from the scope or spirit of the invention as defined by the appended claims.

The invention claimed is:

1. A radio frequency signal reception device, comprising:
at least one analog stage into which a DC component in a signal passing through the analog stage is present, each of the at least one analog stage having compensation points at each of which a compensation DC signal is added from digital-to-analog conversion of a compensation value in order to cancel a DC component measured at an end of the at least one analog stage; and
a module that produces the compensation DC signals that are added to the compensation points of the at least one analog stage;
the module being configured to:
calculate an approximate gain vector with a number of components corresponding to the number of compensation points, each component being based on gain and attenuation values of analog components located downstream of the corresponding compensation point in the at least one analog stage;
calculate a corresponding unit gain vector by dividing the approximate gain vector by its Euclidean norm;
calculate a first term representing a value to be compensated divided by the gain vector norm and multiplying a product of this result with the unit gain vector;
calculate a new compensation vector by adding a second term to the first term, the second term being a current compensation vector or a scalar product of the current compensation vector with the unit gain vector multiplied by the unit gain vector; and
limiting each value of the new compensation vector to a maximum admissible value of a corresponding digital-to-analog converter used to generate a corresponding compensation signal.

2. The device of claim 1, wherein the module is configured to use in the calculation of the approximate gain vector, components which are a product of gain and attenuation values of analog components located downstream of the corresponding compensation point in the at least one analog stage.

3. The device of claim 1, further comprising a DC offset estimator interposed between the end of the at least one analog stage and the module.

4. The device of claim 3, wherein the DC offset estimator is configured to provide a DC offset estimation value, the module being configured to utilize the DC offset estimation value when producing the compensation DC signals.

5. The device of claim 1, wherein the module comprises a plurality of compensation value calculation units each configured to calculate a respective one of the compensation values and provide the calculated compensation value to the respective one of the compensation points.

6. The device of claim 5, wherein each of the compensation value calculation units comprises a multiplier that multiplies a DC offset estimation value obtained from the end of the at least one analog stage and a respective coefficient dependent on current gain and attenuator values.

7. The device of claim 6, wherein each of the compensation value calculation units further comprises:
a gated D latch;
a switch; and
an adder that adds a product of the respective coefficient and the DC offset estimation value and output of the gated D latch, the adder providing a sum to the switch, the switch also receiving an initial DC offset value obtained from calibration.

8. The device of claim 1, wherein the module is further configured to reiteratively repeat the first term calculation, the new compensation vector calculation and the calculated value lowering steps.

9. A radio frequency signal reception device, comprising:
at least one analog stage into which a DC component in a signal passing through the analog stage is present, each of the at least one analog stage having compensation points at each of which a compensation DC signal is added from digital-to-analog conversion of a compensation value in order to cancel a DC component measured at an end of the at least one analog stage;
a DC offset estimator situated at an end of the at least one analog stage: and
a module that receives a DC offset estimation value from the DC offset estimator and produces based thereon, the compensation DC signals that are added to the compensation points of the at least one analog stage, the module comprising a plurality of compensation value calculation units each configured to calculate a respective one of the compensation values based on gain and attenuation values of analog components located downstream of the corresponding compensation point in the at least one analog stage and provide the calculated compensation value to the respective one of the compensation points;
wherein each of the compensation value calculation units comprises a multiplier that multiplies a DC offset estimation value obtained from the end of the at least one analog stage and a respective coefficient dependent on current gain and attenuator values.

10. The device of claim 9, wherein each of the compensation value calculation units further comprises:
a gated D latch;
a switch; and
an adder that adds a product of the respective coefficient and the DC offset estimation value and output of the gated D latch, the adder configured to provide a sum to the switch.

11. The device of claim 10, wherein the switch in at least one of the compensation value calculation units
is configured to receive an initial DC offset value obtained from calibration.

12. A radio frequency signal reception device, comprising:
at least one analog stage into which a DC component in a signal passing through the analog stage is present, each of the at least one analog stage having compensation points at each of which a compensation DC signal is added from digital-to-analog conversion of a compensation value in order to cancel a DC component measured at an end of the at least one analog stage;

a DC offset estimator situated at an end of the at least one analog stage; and a module that receives a DC offset estimation value from the DC offset estimator and produces based thereon, the compensation DC signals that are added to the compensation points of the at least one analog stage, the module comprising a plurality of compensation value calculation units each configured to calculate a respective one of the compensation values based on gain and attenuation values of analog components located downstream of the corresponding compensation point in the at least one analog stage and provide the calculated compensation value to the respective one of the compensation points; wherein the module is configured to:

calculate an approximate gain vector with a number of components corresponding to the number of compensation points, each component being based on gain and attenuation values of analog components located downstream of the corresponding compensation point in the at least one analog stage;

calculate a corresponding unit gain vector by dividing the approximate gain vector by its Euclidean norm;

calculate a new compensation vector using the unit gain vector; and adjust the new compensation vector to accommodate a maximum admissible value of a digital-to-analog converter used to generate at least one compensation signal when a value of a component of the new compensation vector is higher than the maximum admissible value.

13. The device of claim 12, wherein the module is configured to use in the calculation of the approximate gain vector, components which are a product of gain and attenuation values of analog components located downstream of the corresponding compensation point in the at least one analog stage.

14. The device of claim 12, wherein the module is further configured to reiteratively repeat the new compensation vector calculation and the new compensation vector adjustment.

15. A radio frequency signal reception device, comprising:
a plurality of analog stages;
a plurality of compensation points interspersed between the plurality of analog stages, wherein each compensation point is configured to add a compensation signal to a signal received from an analog stage;
a DC offset estimator following one of the plurality of analog stages;
a module including:
an input configured to receive a DC value from the DC offset estimator;
a compensation unit configured to calculate a plurality of compensation signals, wherein each compensation signal is calculated by multiplying the DC value with a coefficient related to gain and attenuation of at least one of the plurality of analog stages; and
a plurality of outputs, each output configured to supply one of the plurality of compensation signals to a corresponding compensation point by providing the compensation signal to a digital-to-analog converter.

* * * * *